United States Patent [19]

Ohno et al.

[11] Patent Number: 5,748,862

[45] Date of Patent: May 5, 1998

[54] IMAGE PROCESSING APPARATUS AND METHOD

[75] Inventors: Takashi Ohno; Jouji Ooki, both of Yokohama, Japan

[73] Assignee: Canon Kabushiki Kaisha, Tokyo, Japan

[21] Appl. No.: 780,942

[22] Filed: Jan. 10, 1997

[30] Foreign Application Priority Data

Jan. 11, 1996 [JP] Japan .................................. 8-002960

[51] Int. Cl.⁶ .................................................. G06A 15/00
[52] U.S. Cl. ........................................ 395/115; 395/116
[58] Field of Search ................................ 395/101, 102, 395/109, 112, 113, 114, 115, 116, 509, 502, 503, 504, 505, 506, 508, 510, 516, 497.01, 497.02, 497.03, 497.04, 873, 876; 358/404, 444, 449; 382/284, 303, 304

[56] References Cited

U.S. PATENT DOCUMENTS 5,068,805  11/1991  Tsuzuki ............................. 395/164
5,604,846   2/1997  Kadota ............................. 395/115

*Primary Examiner*—Arthur G. Evans
*Attorney, Agent, or Firm*—Fitzpatrick, Cella, Harper & Scinto

[57] ABSTRACT

One page is segmented into a plurality of bands (segments), and dot image data is generated on a per band basis from given information (graphic object). High-speed printing with a small-sized memory is achieved by allowing one band to be converted into dot image data and dot image data for another band to be transmitted to a printer, concurrently in parallel. When the conversion of a band to dot image data needs more time than is available for printing one band, or when the data quantity of object per page exceeds an allocated memory area, an object corresponding to a degraded image data is generated, and then the degraded image data is generated on a per band basis based on the resulting object.

30 Claims, 8 Drawing Sheets

IMAGE PROCESSING APPARATUS AND METHOD

BACKGROUND OF THE INVENTION

1. Field of the Invention

The present invention relates to an image processing apparatus and method and more specifically, to an image processing apparatus and method for controlling a printer, in which a page is segmented into a plurality of bands to perform printing based on the output image that is expanded into each band.

2. Description of the Related Art

Printing devices such as laser printers are today in widespread use as an output device for computers. The laser printer converts its input data into internal data that describes how objects should be drawn, and then expand the internal data into bitmap data by drawing the objects, as appropriate, into bitmap memory. To save memory, some printers segment bitmap memory into multiple bands, such as a 2-band memory for storing two bands, rather than having bit map memory for an entire page of image data. Image data for one page is comprised of multiple ones of such bands, and is transmitted on a per band basis to a printer engine.

With a large amount of data input, printing devices without a full page of bit map memory are often unable to print when there is not enough memory for storing an object being expanded from internal data, or when one page includes a band that requires a long period of time to expand the object. To cope with such a situation, objects are expanded into bit map memory with the bit map data intentionally degraded in resolution. This method, however, lowers not only printing quality but also printing throughput.

SUMMARY OF THE INVENTION

Accordingly, it is an object of the present invention to provide a method and apparatus for controlling a printer, wherein when an object that is generated by analyzing printing information received from a source of data is stored in a band memory area allotted in a memory, the band memory area and the memory for the object are relocated by determining the storage data quantity or the expansion time for the object while degrading the resolution or the gradation of the object for a smaller data quantity, and then image expansion is continuously performed in connection with the relocated band, thereby preventing printing throughput from dropping.

It is another object of the present invention to provide an image processing apparatus of a type that generates image data on a per band basis in response to input information, wherein the image processing apparatus outputs an image without any substantial drop in throughput even when it handles a band that requires a long period of time for the generation of corresponding image data.

It is yet another object of the present invention to provide an image processing apparatus of a type that generates image data on a per band basis, wherein the image processing apparatus outputs an image without any substantial drop in throughput even when one-page information to be converted is of a large quantity.

In one aspect of the present invention, in the apparatus for controlling a printer, which stores, in a memory, printing information received from a source of data, generates an object being drawn through the analysis of the page-by-page printing information stored in the memory, stores the generated object onto a first memory area allotted in the memory, stores an output image into which the object is expanded, onto one of a first band memory area and a second band memory area within a second memory area allotted in the memory, and transmits the output image stored in one of the first band memory area and the second band memory area to a printing section, said apparatus comprises object management means for splitting the object, stored in the first memory area, among a plurality of bands into which one page is segmented, and for selectively specifying the first band memory area and the second band memory area as the destination in which the object on each segmented band is expanded, and control means for controlling the expansion of the output image based on the object split among the bands, onto the one of the first band memory area and the second band memory area specified by the object management means.

In another aspect of the present invention, the control means performs concurrently both the transmission of the output image into which the preceding band, out of the first band memory area and the second band memory area, is already expanded, and the expansion of the output image of the subsequent band.

In yet another aspect of the present invention, the apparatus comprises determining means for determining whether the first memory area in the memory is able to store the object, modifying means for modifying the first memory area and the second memory area in the memory based on the determination result of the determining means, and first object processing means for reproducing a low-resolution object from the object based on the determination result of the determining means.

In yet another aspect of the present invention, the apparatus comprises determining means for determining whether the first memory area in the memory is able to store the object, modifying means for modifying the first memory area and the second memory area in the memory based on the determination result of the determining means, and second object processing means for reproducing a small-numbered level gradation object from the object based on the determination result of the determining means.

In yet another aspect of the present invention, the apparatus comprises computing means for computing a predicted expansion time of the object, determining means for determining whether the predicted expansion time computed by the computing means is within a predetermined band expansion time limit, and third object processing means for reproducing a low-resolution object from the object based on the determination result of the determining means.

In yet another aspect of the present invention, the apparatus comprises computing means for computing a predicted expansion time of the object, determining means for determining whether the predicted expansion time computed by the computing means is within a predetermined band expansion time limit, and fourth object processing means for reproducing a small-numbered level gradation object from the object based on the determination result of the determining means.

In yet another aspect of the present invention, the method for controlling a printer, which stores, in a memory, printing information received from a source of data, generates an object being drawn through the analysis of the page-by-page printing information stored in the memory, stores the generated object onto a first memory area allotted in the memory, stores an output image into which the object is expanded, onto one of a first band memory area and a second band memory area within a second memory area allotted in the memory, and transmits the output image stored in one of the first band memory area and the second band memory area to a printing section, said method comprises the step of determining whether the first memory area in the memory is able to store the object, the step of modifying between the first memory area and the second memory area in the memory based on the determination result, and the first reproducing step of reproducing a low-resolution object from the object based on the determination result of the determining means.

In yet another aspect of the present invention, the method, which stores, in a memory, printing information received from a source of data, generates an object being drawn through the analysis of the page-by-page printing information stored in the memory, stores the generated object onto a first memory area allotted in the memory, stores an output image into which the object is expanded, onto one of a first band memory area and a second band memory area within a second memory area allotted in the memory, and transmits the output image stored in one of the first band memory area and the second band memory area to a printing section, said method comprises the step determining whether the first memory area in the memory is able to store the object, the step of modifying the first memory area and the second memory area in the memory based on the determination result, and the second reproducing step of reproducing a small-numbered level gradation object from the object based on the determination result.

In yet another aspect of the present invention, the method, which stores, in a memory, printing information received from a source of data, generates an object being drawn through the analysis of the page-by-page printing information stored in the memory, stores the generated object onto a first memory area allotted in the memory, stores an output image into which the object is expanded, onto one of a first band memory area and a second band memory area within a second memory area allotted in the memory, and transmits the output image stored in one of the first band memory area and the second band memory area to a printing section, said method comprises the step of computing a predicted expansion time of the object, the step of determining whether the predicted expansion time computed by the computing means is within a predetermined band expansion time limit, the step of modifying the first memory area and the second memory area in the memory based on the determination result, and the third reproducing step of reproducing a low-resolution object from the object based on the determination result.

In yet another aspect of the present invention, the method, which stores, in a memory, printing information received from a source of data, generates an object being drawn through the analysis of the page-by-page printing information stored in the memory, stores the generated object onto a first memory area allotted in the memory, stores an output image into which the object is expanded, onto one of a first band memory area and a second band memory area within a second memory area allotted in the memory, and transmits the output image stored in one of the first band memory area and the second band memory area to a printing section, said method comprises the step of computing a predicted expansion time of the object, the step of determining whether the predicted expansion time computed by the computing means is within a predetermined band expansion time limit, the step of modifying the first memory area and the second memory area in the memory based on the determination result, and the fourth step of reproducing a small-numbered level gradation object from the object based on the determination result.

These and other objects and advantages of the present invention will be more fully understood from the following description, the drawings and claims.

DESCRIPTION OF THE PREFERRED EMBODIMENTS

Referring to the drawings, the embodiments of the present invention are now discussed.

Figure 1:
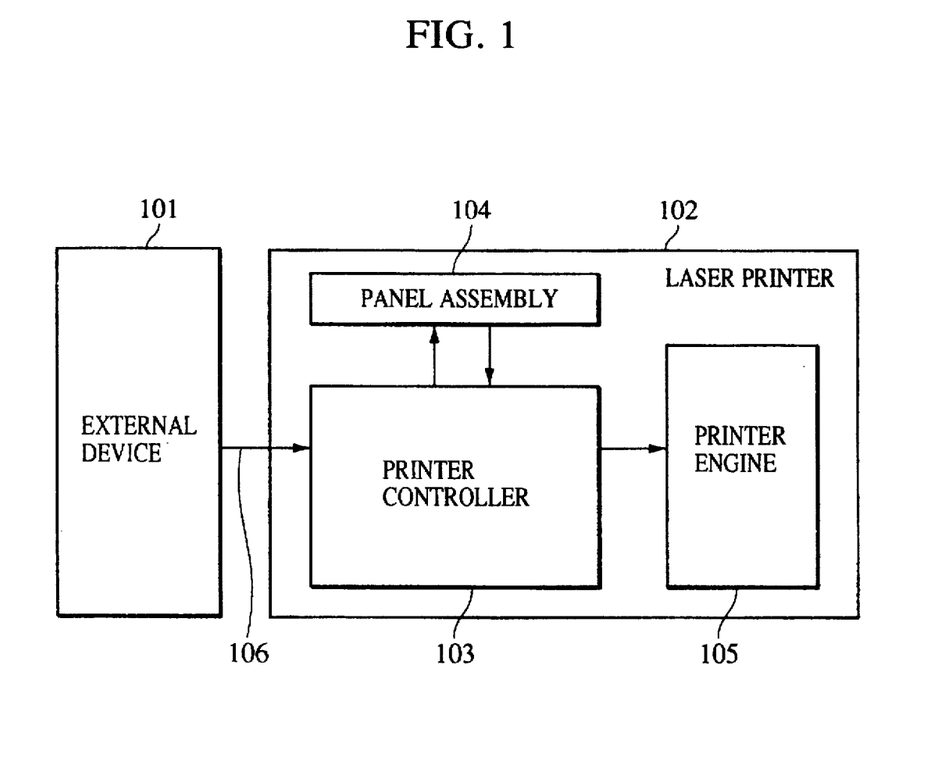
FIG. 1 is a block diagram showing the general arrangement of a printing system into which the present invention can be implemented.

FIG. 1 is the block diagram showing the general arrangement of the printing system into which the present invention can be implemented.

Shown in FIG. 1 are an external device 101 such as a host computer, a printing device (printer) 102, which is, in this embodiment, a laser printer equipped with a laser printer engine (printer engine) 105. The printer engine 105 produces a latent image on a photoconductor drum through a known electrophographic process in response to image data (two-level or multi-level quantized data) and transfers and fixes it to a copy sheet for printing.

The printer device 102 includes printer controller 103, connected to the printer engine 105, to receive code data (ESC codes, PDLs) coming in from the external device 101 such as a host computer, and to supply, according to the code data, page information made up of dot data via predetermined interface means to the printer engine 105.

A panel assembly 104 functions as an interface with a user (an operator). Operating the panel assembly 104, the user commands the printer 102 to function as instructed.

The external device 101 and the printing device 102 are connected via an interface 106 such as a bi-directional IEEE 1285 interface.

Figure 2:
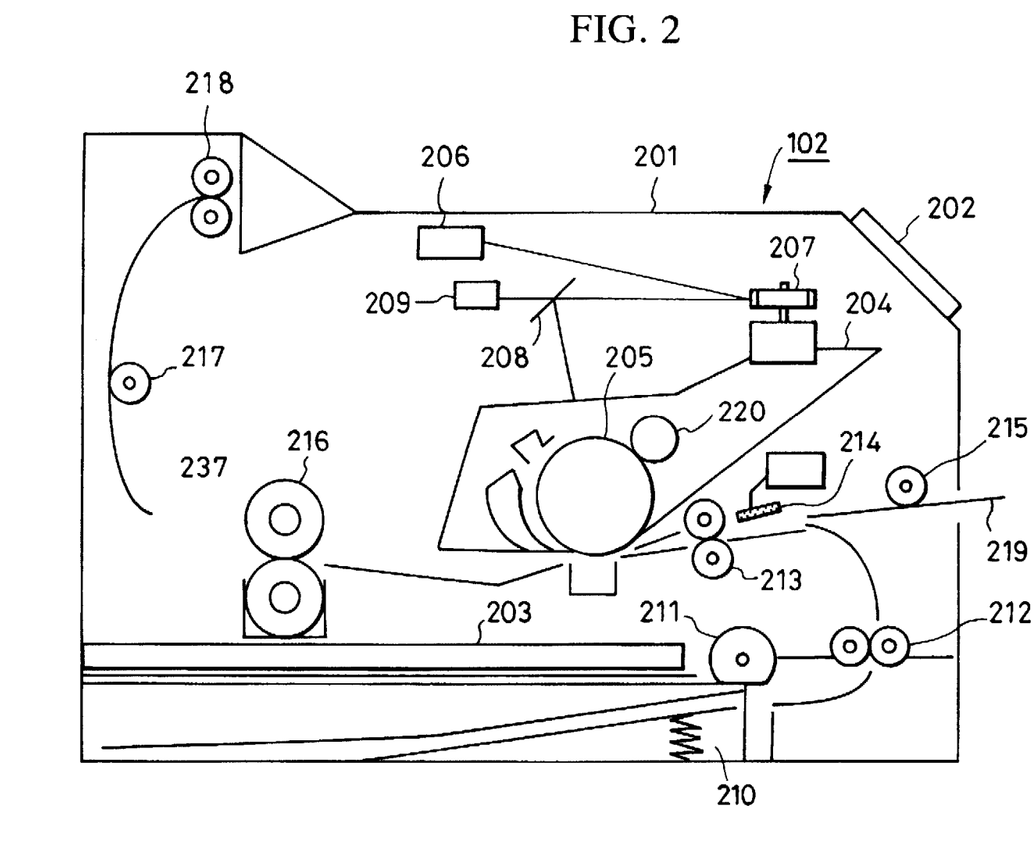
FIG. 2 is a diagrammatic cross-sectional view showing the arrangement of the printer engine of the printing system in FIG. 1.

FIG. 2 is the diagrammatic cross-sectional view showing the arrangement of the printer engine 105 of the printer 102 shown in FIG. 1.

Also shown in FIG. 2 are a printer cabinet 201 and an operation panel 202 on which switches, LED indicators, and LCD indicators, are mounted.

A control board housing 203 houses a control block of the printer engine 105 for controlling printing process and the printer controller 103 for analyzing data from the external device 103 such as a host computer and converting it to image data.

A paper feeder cassette 210 holds sheets of paper and has an unshown partitioning plate through which the size of the sheets is electrically sensed. A paper feed cam 211 nips the top paper sheet only out of the sheets stacked in the paper feeder cassette 210, and unshown driving means transports the nipped sheet to paper feed rollers 212. The paper feed rollers 212 advance the paper sheet until its forward end reaches a timing shutter 214. The paper feed cam 211 rotates each time each paper sheet is fed, and one rotation of the paper feed cam 211 feeds a sheet of paper. The timing shutter 214 pressurizes the paper sheet to stop its advance. The timing shutter 214 is opened in synchronization with the timing at which the formation of a latent image on a photoconductor drum 205 starts and then allows the paper sheet to advance further.

Paper sheets are also manually fed by means of a manual paper feeder tray 219 and a manual paper feed clutch 215. In the above arrangement, paper sheets are fed selectively either from the paper feeder cassette 210 or from the manual paper feeder tray 219.

A cartridge 204 houses the photoconductor drum 205 and an unshown toner holder. A semiconductor laser 206 emits a laser that is modulated by input image signal. A rotating polygon mirror 207 deflects the laser beam emitted by semiconductor laser 206.

A reflecting mirror 208 reflects the laser deflected by the rotating polygon mirror 207 to irradiate the photoconductor drum 205 in the cartridge 204. A beam detector 209, constructed of a photodiode or the like, receives the laser beam that scans a non-image area and generates a BD (beam detect) signal that is used to generate a horizontal synchronization signal for readout of the image signal. A toner image is transferred to the paper sheet, and fixing rollers 216 thermal and pressure fuse the toner image to the sheet paper. The fixing method may be an on-demand fixing method. Transport roller 217 transports the fused sheet paper upward. Delivery rollers 218 deliver the paper sheet into a delivery tray in the printer cabinet.

The image processing operation of the printer is now discussed.

During imaging, the printer engine 105 communicates with the printer controller 103 in a predetermined communications protocol, and selects paper feeder means from the paper feeder cassette 210 and manual paper feeder tray 219 according to the instruction from the printer controller 103, and starts paper feeding according to a print start instruction and advances a paper sheet to the timing shutter 214. At the moment the paper sheet reaches the timing shutter 214, the semiconductor laser 206 emits a laser beam in an on/off fashion in response to the image data coming in from the printer controller 103. The rotating polygon mirror 207 causes the laser beam to scan in its main-scan direction. The laser beam is then reflected by the reflecting mirror 208 to the photoconductor drum 205 to form a latent image thereon. The laser beam thus scans in its main-scan direction to form the latent image along the main-scan line. In synchronism with the emission of the laser beam, the timing shutter 214 is driven upward such that the advance of the paper sheet is synchronized with the sub-scan motion of the laser beam.

At the beginning of the scan of the laser beam, the beam detector 209 detects the laser beam to generate a horizontal synchronization signal (BD signal) that determines the timing of the start of image writing in the main scan direction, and then issues the horizontal synchronization signal to the printer controller 103. The paper sheet is advanced by transport rollers 213, and the photoconductor drum 205 is driven by an unshown motor such as a pulse motor. The latent image on the photoconductor drum 205 is developed into a toner image by development unit 220, and is then transferred to the paper sheet. The toner image-bearing paper sheet is subjected to a thermal and pressure fusing process through the fixing rollers 216. The toner image is thus fixed onto the paper sheet. The paper sheet is then delivered into the delivery tray in the printer cabinet via the transport roller 217 and then via the delivery rollers 218.

Figure 3:
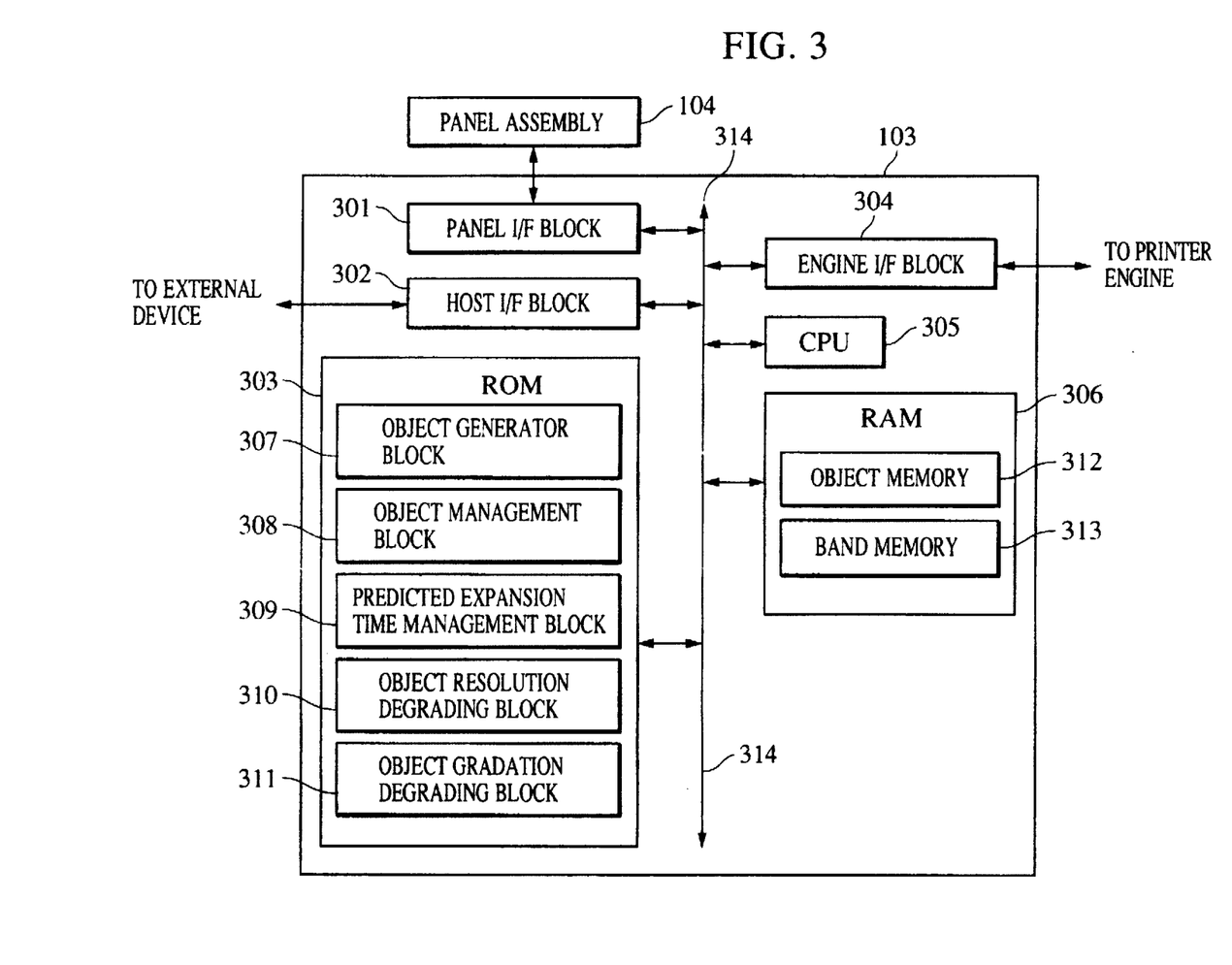
FIG. 3 is a block diagram showing the printer according to a first embodiment of the present invention.

FIG. 3 is a block diagram showing the internal arrangement of the printer controller 103 of FIG. 1 in the printer according to the first embodiment of the present invention.

As shown, a panel interface block (panel I/F block) 301 performs data communication with the panel assembly 104 to receive a diversity of instructions of the operator. A host interface block (host I/F block) 302 functions as an interface for communications with the external device 101 such as the host computer. An engine interface block (engine I/F block) 304 functions as a signal input/output interface with the printer engine 105 to output data signal from an unshown output buffer register and to control communications with the printer engine 105.

CPU305 controls generally the printer controller 103 under the control program stored in ROM303. ROM303 stores blocks of graphic processing programs to be executed by CPU305. An object generator block 307 stores a graphic object generating program that generates a graphic object from analyzed internal data.

An object management block 308 stores a graphic object managing program that controls the number of graphic objects and a memory address allotted to each graphic object.

A predicted expansion time management block 309 stores a predicted expansion time management program for predicting the time required to expand the graphic object into an image, and manages the predicted expansion time for each band. An object resolution degrading block 310 stores an object resolution degrading program for degrading the resolution of a graphic object that is being generated, or of a graphic object that has already been generated. An object gradation degrading block 311 stores an object gradation degrading program for making small the number of levels of the gradation of a graphic object that is being generated, or of a graphic object that has already been generated.

RAM306 is extensible and used as an object memory 312 and a band memory 313. A system bus 314 comprises an address bus and a data bus. The panel interface block 301, host interface block 302, ROM303, engine interface block 304, RAM306, and CPU305 are connected to the system bus 314, and are accessible to every functional block on the system bus 314.

In this embodiment, the control code that controls CPU305 is constructed of the OS (Operating System) that performs controlling on a time division basis, namely on a per load module, or task, basis in response to an unshown system clock and a plurality of load modules (task) executed on a per function basis.

Figure 4A:
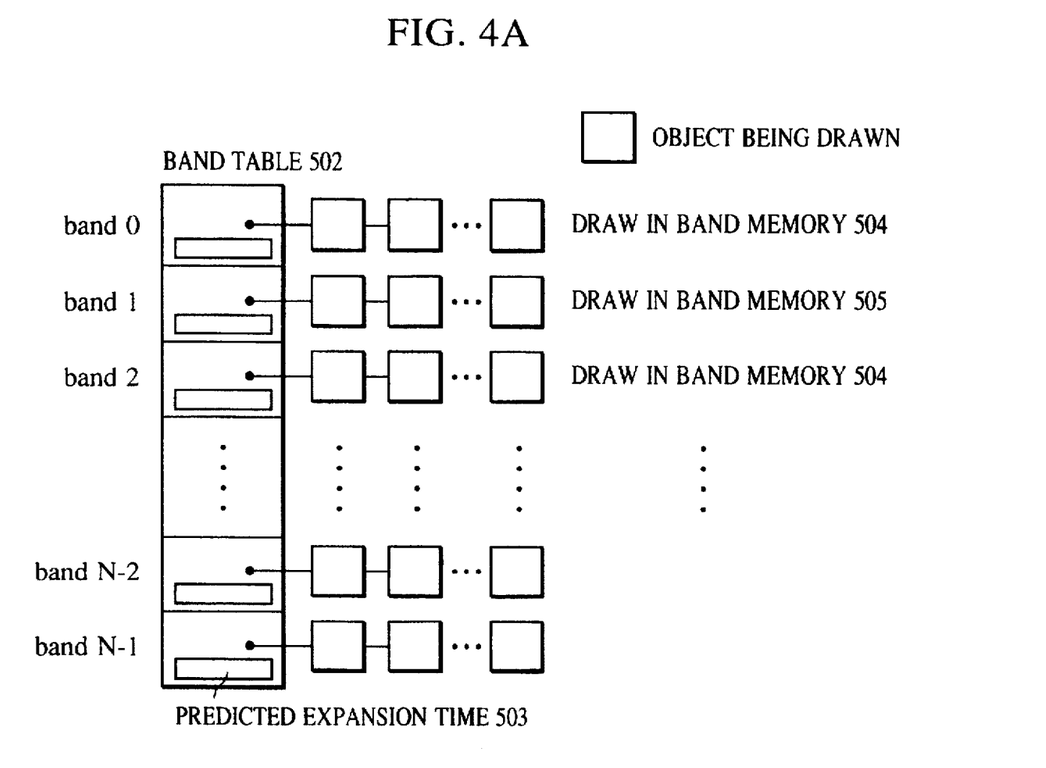
FIGS. 4A and 4B are diagrams showing a banding process for the band memory in FIG. 3.
Figure 4B:
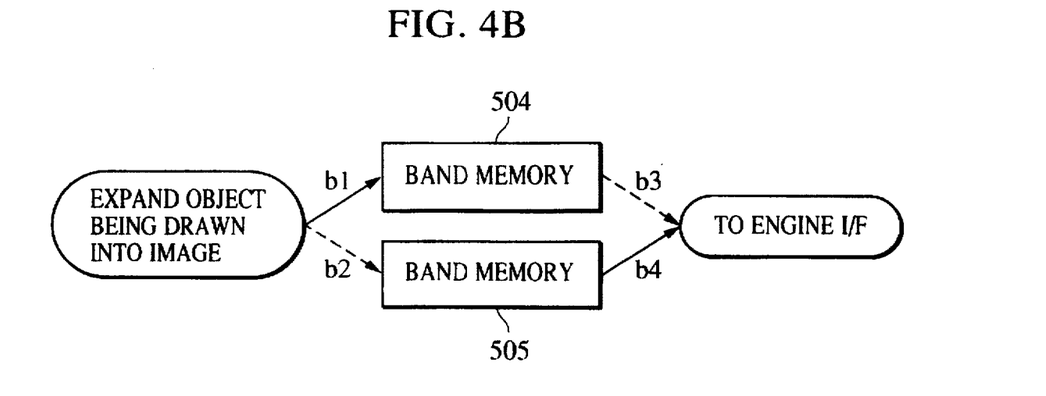

FIGS. 4A and 4B are diagrams showing the banding process for the band memory 313 in FIG. 3. FIG. 4A shows a band table 502 that manages objects drawn in each of the band memory areas 504 and 505 allotted in the band memory 313 in RAM306. FIG. 4B shows the sequence of writing and reading for each of the band memory areas 504 and 505, namely in the sequence of b1, . . . , b4.

Each square in FIG. 4A shows the analysis result of received data that is a graphic object sorted according to the class of information such as images and graphics and stored as internal data into band memory areas. Band tables 502 are linked with and hold objects that are split among bands according to drawing position. Each band holds a predicted expansion time 503 that is the sum of all predicted expansion times (predicted by the predicted expansion time management block 309) of all objects within each of the bands.

The band memory areas 504 and 505 store image data into which the objects within the respective bands are expanded. The image data in the band memory areas 504 and 505 are transmitted to the engine interface block 304 to be printed. In the banding process in this embodiment, all objects within band 0 are image-expanded onto the band memory area 504 (b1), and all objects within band 1 are image-expanded onto the band memory area 505 (b2). At the moment the expansion is completed, the image data in the band memory area 504 is transmitted to the engine interface block 304 (b3).

Upon completion of the transmission of the image data from the band memory area 504, the image data is transmitted to the engine interface block 304 from the band memory area 505 (b4) while the objects 501 within band 2 are expanded onto the band memory area 504 that has already transmitted its image data to the engine interface block 304 (b1). Upon completion of the transmission of the image data from the band memory area 505, the image data is transmitted to the engine interface block 304 from the band memory area 504 (b3), while the objects within band 3 are expanded onto the band memory area 505 (b2).

In this way, the band memory areas 504 and 505 alternately perform image expansion and data transmission to the engine interface block 304 to fast process images.

To successfully perform the above banding process, all objects in the next band must be fully expanded and be ready for data transmission to the engine interface block 304, before data transmission from the band memory area 504 to the engine interface block 304 is completed. An error, called an overrun, takes place if the image expansion for a second band is not completed before the data transmission of a first band preceding to the second one is completed. In the banding process, the predicted expansion time management block 309 computes the predicted expansion times when the objects are split among the bands. If the resulting times fail to meet engine transfer time requirement, the objects are resolution-degraded and full-memory processing is activated to preclude the overrun.

Embodiment 1

Figure 5:
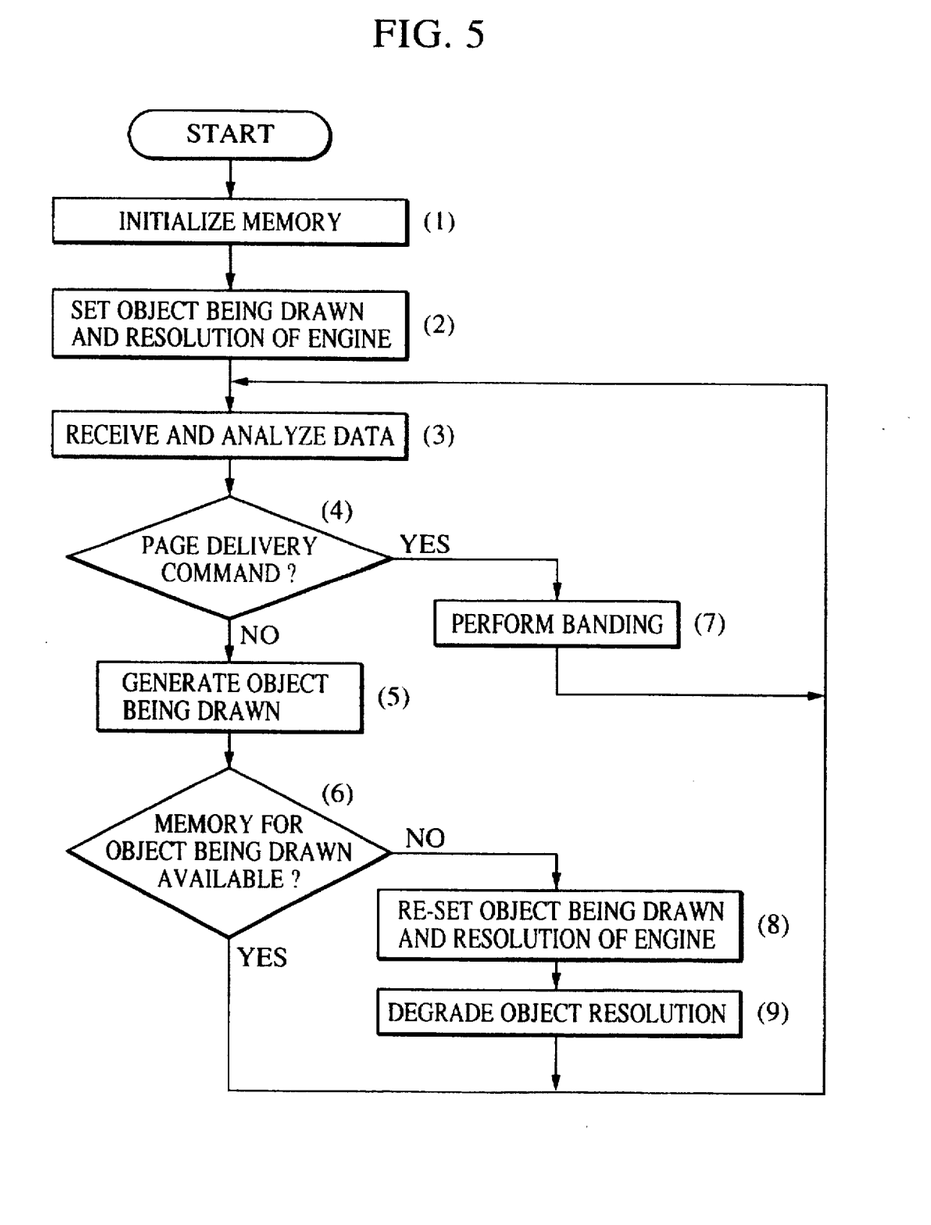
FIG. 5 is a flow diagram showing a first embodiment of the printer control method of the present invention.

FIG. 5 is the flow diagram showing a first embodiment of the printer control method of the present invention. (1) through (9) represent processing steps executed by CPU305 and stored in ROM303.

When the image processing program starts at power on, the band memory 313 and band table 502 are initialized (1). A specified resolution is set to the object generator block 307, printer engine 105 and the like (2). At a proper time period, an enquiry is made to the host interface block 302 about the presence or absence of received data. When the host interface block 302 receives data, commands in the data are analyzed (3), and a determination is made of whether the received command is a page delivery command (4). The page delivery command, which may be a control code such as "Paper Feed Code" or a command called "show page" (PostScript), indicates the end of each page. The same is true for steps (4) in FIGS. 7 and 9. When the determination reveals that the command is not a page delivery command, status information is set or an object is generated at the object generator block 307 (5). At this time, a determination is made of whether a memory area is available to store the object (6). If the determination answers yes, the object memory 312 is allotted in RAM306, and the generated object is registered in the object management block 308.

At step (6), when the determination reveals that no memory area is available, a resolution resetting process is performed to degrade the resolution at the object generator block 307 and the printer engine 105 (8). With the resolution degraded thereafter, the objects are generated.

The band memory 313 allotted in RAM306 is relocated, the objects already registered in the object management block 308 are subjected to a resolution degrading process (9), and are relocated, and the sequence of image processing returns to step (3). When the resolution degrading process ends, objects can be generated, and the sequence of image processing takes normal steps.

At step (4), when the determination reveals that a page delivery command comes in during data analysis, the banding process is performed at step (7) at the predetermined resolution, the sheet paper is delivered, and the sequence returns to step (3) for next page. In the banding process, a printing operation of one page (or a transmission of image data of one page) is performed. The same is true for step (7) shown in FIG. 7 and step (8) shown in FIG. 9.

Figure 6:
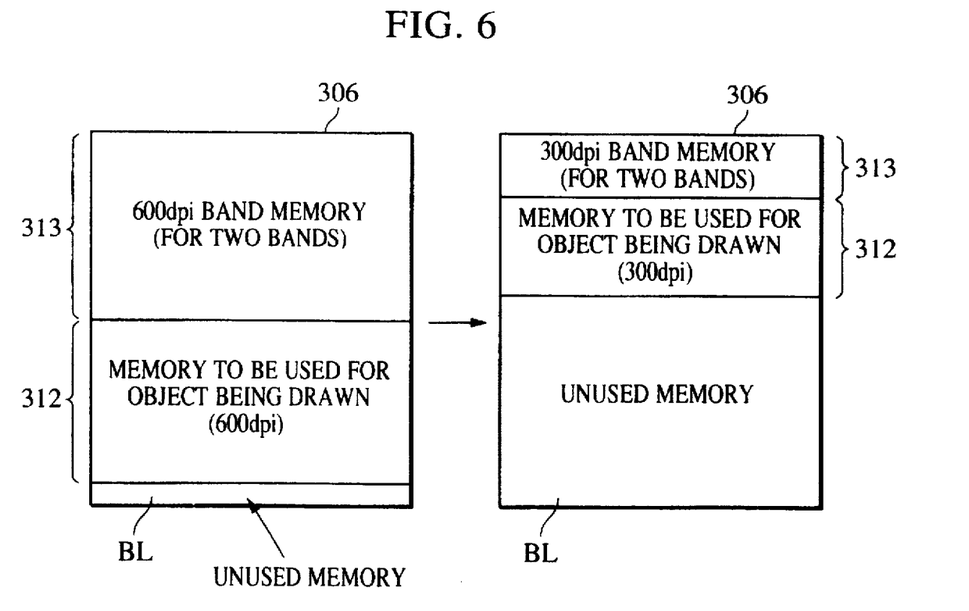
FIG. 6 is a diagram showing the first drawn state of object in a band memory allotted in the RAM in FIG. 3.

FIG. 6 is the diagram showing the first drawn state of object in the band memory 313 allotted in RAM306 in FIG. 3, corresponding to the memory relocated state in which according to the resolution degrading process at step (9) in FIG. 5, the initial setting of a resolution of 600 dpi is changed to a resolution of 300 dpi.

As shown, the band memory 313 of 600 dpi is allotted in RAM306, and the object memory area 312 is allotted in the remaining memory area. Sequentially, objects of 600 dpi are stored in the object memory area 312. When no further memory areas are available for objects, the resolution of the band memory 313 is set to be 300 dpi.

Each of the objects already stored in RAM306 is converted to its 300 dpi resolution version, and then relocated in upper memory areas. The resolution degrading process thus vacates at least three-quarters of the memory for the band memory 313 with the resolution at 600 dpi, and ensures the object memory 312 at a resolution of 300 dpi.

The printer is controlled as described above, and thus performs a fast printing through the banding process that would otherwise preclude full-band processing because of insufficient memory.

Embodiment 2

In the above embodiment, when no further memory areas are available for the objects at the high resolution level, the band memory 313 is shifted to a resolution of 300 dpi to continuously perform the banding process. An object being drawn may have a multi-level gradation. If no further memory areas are available for such an object, the gradation level of the band memory 313 may be set to be a binary level gradation to continue the banding process. Such a method is now discussed in connection with a second embodiment of the invention.

Figure 7:
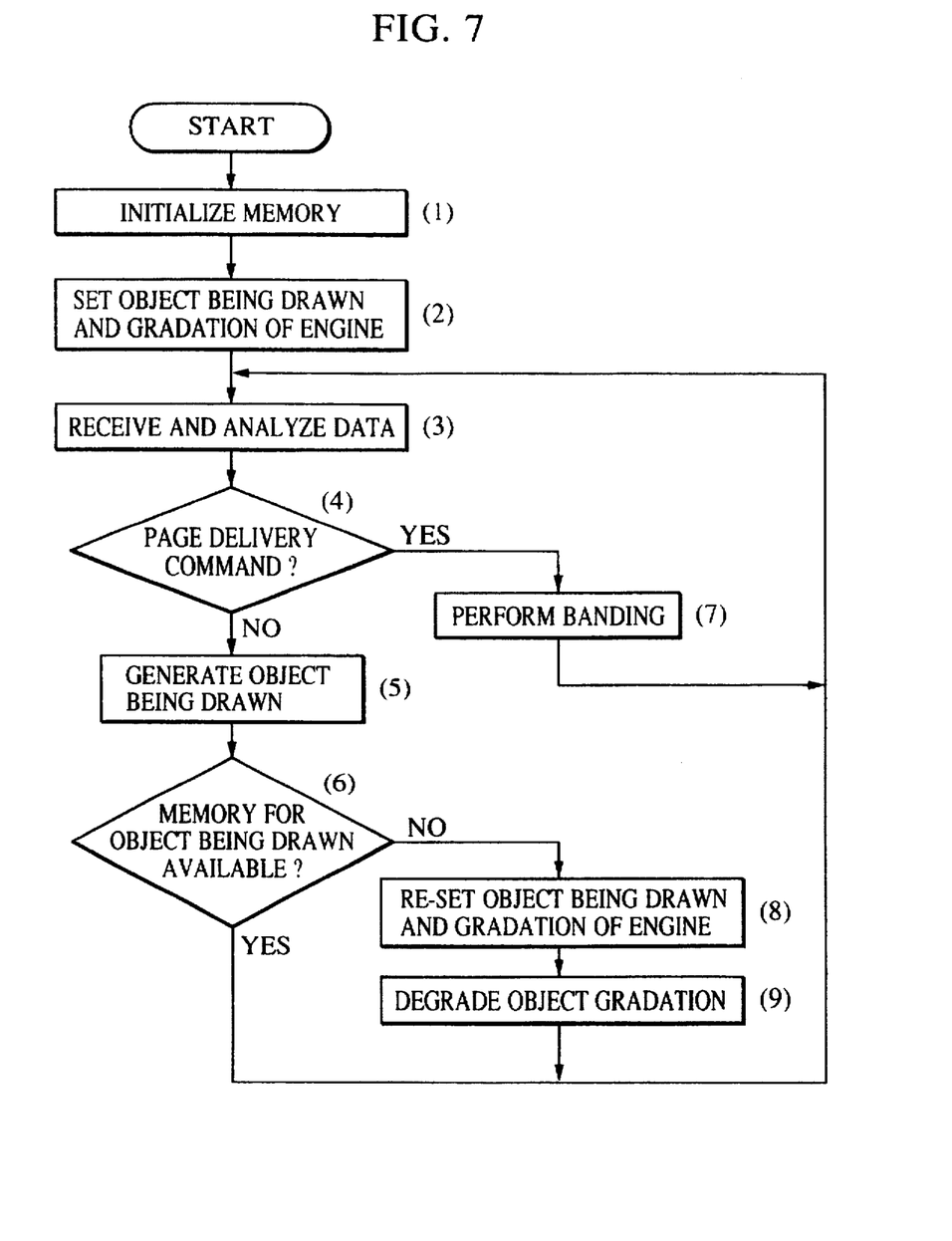
FIG. 7 is a flow diagram showing a second embodiment of the printer control method of the present invention.

FIG. 7 is the flow diagram showing the second embodiment of the printer control method of the present invention. (1) through (9) represent processing steps executed by CPU305 and stored in ROM303.

When the image processing program starts at power on, the band memory 313 and band table 502 are initialized (1). A specified gradation level (for example, 4-level gradation) is set to the object generator block 307, printer engine 105 and the like (2). At a proper time period, an enquiry is made to the host interface block 302 about the presence or absence of received data.

When the host interface block 302 receives data from the external device 101, commands in the data are analyzed (3), and a determination is made of whether the received command is a page delivery command (4). When the determination reveals that the command is not a page delivery command, status information is set or an object is generated at the object generator block 307 (5). At this time, a determination is made of whether a memory area is available to store the object memory 312 at the initially set gradation (6). If the determination answers yes, the object memory 312 is allotted in RAM306, and the generated object is registered in the object management block 308.

At step (6), when the determination reveals that no memory area is available for the object memory 312 in RAM306, an engine gradation is reset so that the gradation at the object generator block 307 and the printer engine 105 is lowered (8). With the gradation level degraded thereafter, the objects are generated.

The band memory 313 allotted in RAM306 is relocated, the objects already registered in the object management block 308 are subjected to a gradation degrading process (9), and are relocated, and the sequence of image processing returns to step (3). When the gradation degrading process ends, objects can be generated, and the sequence of image processing takes normal steps.

At step (4), when the determination reveals that a page delivery command comes in during data analysis, the banding process is performed at the predetermined gradation (7), the sheet paper is delivered, and the sequence returns to step (3).

Figure 8:
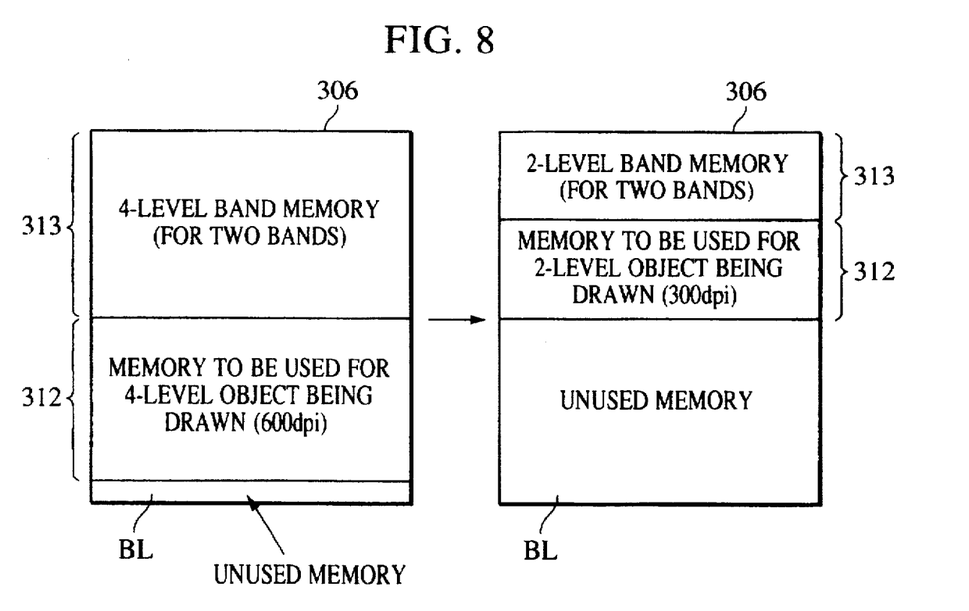
FIG. 8 is a diagram showing a first drawn state of object in a band memory allotted in the RAM in FIG. 3.

FIG. 8 is the diagram showing the second drawn state of object in the band memory 313 allotted in RAM306 in FIG. 3, corresponding to the memory relocated state in which according to the resolution degrading process at step (9) in FIG. 5, the initial setting of a 4-level gradation is changed to a 2-level gradation.

As shown, the band memory 313 of 4-level gradation is allotted in RAM306, and the object memory area 312 is allotted in the remaining memory area. Sequentially, objects are stored the object memory area 312. When no further memory areas are available for objects at the 4-level gradation, the gradation of the band memory 313 is set to be 2-level.

Each of the objects already stored in RAM306 is converted to its 2-level gradation version, and then relocated in upper memory areas. The gradation degrading process thus vacates at least one half of the memory for the band memory 313 with a gradation of 4-level in RAM306, and generates the object of 2-level gradation with a sufficient memory margin allowed.

The printer is controlled as described above, and thus performs a fast printing through the banding process that would otherwise preclude full-band processing because of insufficient memory.

Embodiment 3

In the first and second embodiments, the band memory areas of a high resolution or gradation level initially set are allocated, and when no further object memory areas are available in RAM306, band memory areas of a degraded resolution or of a small-numbered-level gradation are allotted and object memory areas of a degraded resolution or gradation level are allotted in order to continuously perform the banding process. Alternatively, after the generation of objects, the predicted expansion times of the generated objects are computed, a determination is made of whether the computed times are within an expansion time limit, band memory areas of a degraded resolution or of a degraded graduation level are allotted, object memory areas of the degraded resolution or of the degraded graduation level are allotted in order to continuously perform the banding process. Such a processing method is now discussed in connection with a third embodiment of the invention.

Figure 9:
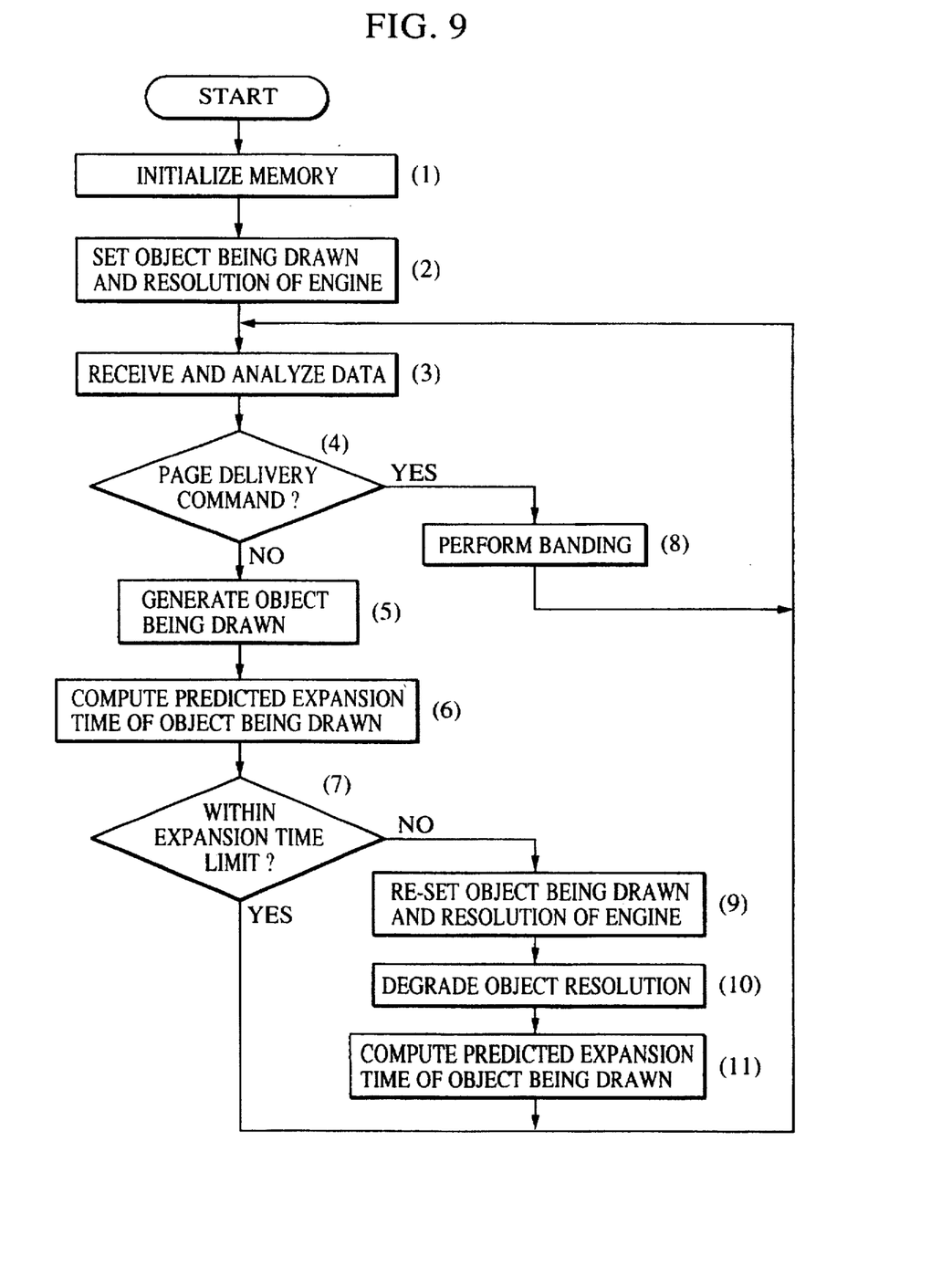
FIG. 9 is a flow diagram showing a third embodiment of the printer control method of the present invention.

FIG. 9 is the flow diagram showing the third embodiment of the printer control method of the present invention. (1) through (11) represent processing steps executed by CPU305 and stored in ROM303.

When the image processing program starts at power on, the band memory 313 and band table 502 are initialized (1). A specified resolution (gradation) is set to the object generator block 307, printer engine 105 and the like (2). At a proper time period, an enquiry is made to the host interface block 302 about the presence or absence of received data. When the host interface block 302 receives data from the external device 101, commands in the data are analyzed (3), and a determination is made of whether the received command is a page delivery command (4). When the determination reveals that the command is not a page delivery command, status information is set or an object is generated at the object generator block 307 (5). The predicted expansion time management block 309 computes the predicted expansion time of each generated object (6), and sums the predicted expansion times within a band table 502. A determination is made of whether the sum exceeds a predetermined control time (7). If it is determined that expansion can be made within expansion time limits, the generated object is registered in the object management block 308, and the sequence of image processing returns to step (3).

When the determination at step (7) reveals that the sum of the computed predicted expansion times exceeds the expansion time limit, the resolution (gradation) of the object generator block 307 and printer engine 105 is reset again (9). With the resolution (gradation) degraded thereafter, objects are generated. The objects generated and registered in the object management block 308 are subjected to the resolution (gradation) degrading process (10), predicted expansion times are computed, and the sequence returns to step (3). When the resolution (gradation) degrading process ends, predicted expansion time is shortened, the generation of objects is possible and the sequence of image processing takes normal steps.

At step (4), when the determination reveals that a page delivery command comes in during data analysis, the banding process is performed at the predetermined resolution (8), the sheet paper is delivered, and the sequence returns to step (3).

The printer is controlled as described above, and thus performs a fast printing through the banding process that would otherwise preclude full-band processing because expansion time would have taken too long.

Embodiment 4

In the first through third embodiments, the resolution degrading process or gradation degrading process is performed depending on whether the memory for the objects is available or whether the computed predicted expansion time of the objects is within the expansion time limit. Alternatively, determinations are made of both whether the memory for the objects is available and whether the computed predicted expansion time of the objects is within the expansion time limit so that the resolution degrading process or the gradation degrading process is performed. Namely, the first through third embodiments are implemented alone or in combination.

The present invention may be implemented into a single apparatus or into a system that is constructed of a plurality of apparatuses. The present invention may be implemented by loading a program onto an apparatus or system. In this case, the apparatus or system is set to offer the advantages of the present invention by allowing itself to read a storage medium holding a software program to carry out the method of the present invention.

A software program to carry out the method of the present invention may be downloaded through a communications program from a database on a network, into the apparatus or system of the present invention. Thus, the system or apparatus may be used as intended.

The present invention is not limited to the above embodiments, and many variations and modifications are possible within the scope of the present invention defined by the claims.

What is claimed is:

1. An image processing apparatus comprising:
generating means for generating image data into a band memory on a per band basis in accordance with objects;
transmitting means for transmitting the per-band image data to output means in a manner such that generation of image data of one band by said generating means and transmission of image data of another band by said transmitting means are performed in parallel; and
determining means for determining the grade of the image data to be generated by said generating means, wherein when the grade determined by said determining means changes, said band memory is relocated and wherein said generating means generates per band image data for an entire page at the grade determined by said determining means.

2. An image processing apparatus according to claim 1, wherein said generating means comprises first means for generating objects for each band in accordance with input information and second means for converting a band of objects into a band of image data.

3. An image processing apparatus according to claim 2, wherein said determining means determines, as the grade of the image data to be generated, a second grade that is inferior to a first grade, when it is determined that a memory area for storing an object corresponding to image data of the first grade is not available.

4. An image processing apparatus according to claim 3, further comprising means for converting an object corresponding to the image data already generated at said first grade into an object corresponding to the image data at said second object when said determining means determines said second grade as the grade of the image data to be generated.

5. An image processing apparatus according to claim 4, wherein once said determining means determines said second grade as the grade for the image data to be generated, said first means generates, based on further input information, an object corresponding to the image data at said second grade.

6. An image processing apparatus according to claim 1, further comprising means for predicting the time required to generate image data on a per band basis, wherein said determining means determines the grade of the image data that is generated in accordance with the predicted time.

7. An image processing apparatus according to claim 6, wherein said generating means comprises first means for generating objects for each band in accordance with input information, and second means for converting a band of objects into a band of image data, wherein said predicting means predicts the time required to convert a band of objects into a band of image data.

8. An image processing apparatus according to claim 7, further comprising means for converting an object corresponding to image data already generated at said first grade into an object corresponding to image data at said second object when said determining means determines said second grade as the grade of the image data to be generated.

9. An image processing apparatus according to claim 7, wherein said determining means determines, as the grade of the image data to be generated, a second grade that is inferior to a first grade, when it is determined that a memory area for storing an object corresponding to image data of the first grade is not available.

10. An image processing apparatus according to claim 9, further comprising means for converting an object corresponding to image data already generated at said first grade into an object corresponding to image data at said second object when said determining means determines said second grade as the grade of the image data to be generated.

11. An image processing apparatus according to claim 10, wherein once said determining means determines said second grade as the grade for the image data to be generated, said first means generates, based on further input information, an object corresponding to image data at said second grade.

12. An image processing apparatus according to claim 1, wherein the grade of the image data includes at least one of resolution and the number of levels of gradation of the image data.

13. An image processing apparatus according to claim 1, further comprising output means for outputting the image data transmitted from said transmitting means.

14. An image processing apparatus according to claim 13, wherein said output means prints an image through an electrophotographic process.

15. An image processing apparatus according to claim 14, further comprising means for predicting the time required to generate the image data on a per band basis, and said determining means comprising means for comparing the predicted time with the time said print means requires to print one band, wherein said determining means determines the grade of the image data to be generated, based on the result of the comparison.

16. An image processing method comprising the steps of:
generating image data into a band memory on a per band basis in accordance with objects;
transmitting the per-band image data to output means in a manner such that generation of image data of one band at said generating step and transmission of image data of another band at said transmitting step are performed in parallel; and
determining the grade of the image data to be generated at said generating step, wherein when the grade determined in said determining step changes, said band memory is relocated and wherein said generating step generates per band image data for an entire page at the grade determined at said determining step.

17. An image processing method according to claim 16, wherein said generating step comprises a first step for generating objects for each band in accordance with input information and a second step for converting a band of objects into a band of image data.

18. An image processing method according to claim 17, wherein said determining step determines, as the grade of the image data to be generated, a second grade that is inferior to a first grade, when it is determined that a memory area for storing an object corresponding to the image data of the second grade is not available.

19. An image processing method according to claim 18 further comprising a step for converting an object corresponding to the image data already generated at said first grade into an object corresponding to the image data at said second object when, at said determining step, said second grade is determined as the grade of the image data to be generated.

20. An image processing method according to claim 19, wherein once said determining step determines said second grade as the grade of the image data to be generated, an object corresponding to the image data at said second grade is generated, based on further input information.

21. An image processing method according to claim 16, further comprising a step for predicting the time required to generate image data on a per band basis, wherein the grade of the image data that is generated in accordance with the predicted time is determined at said determining step.

22. An image processing method according to claim 21, wherein said generating step comprises a first step for generating objects for each band in accordance with the input information, and a second step for converting a band of objects into a band of image data, wherein the time required to convert a band of objects into a band of image data is predicted at said predicting step.

23. An image processing method according to claim 22 further comprising a step for converting an object corresponding to image data already generated at said first grade into an object corresponding to image data at said second object when said determining step determines said second grade as the grade of the image data to be generated.

24. An image processing method according to claim 22, wherein said determining step determines as the grade of the image data to be generated, a second grade that is inferior to a first grade, when it is determined that a memory area for storing an object corresponding to image data of the first grade is not available.

25. An image processing method according to claim 24, further comprising a step for converting an object corresponding to image data already generated at said first grade into an object corresponding to image data at said second object when said determining step determines said second grade as the grade of the image data to be generated.

26. An image processing method according to claim 25, wherein once said determining step determines said second grade as the grade for the image data to be generated, an object corresponding to the image data at said second grade is generated, based on further input information.

27. An image processing method according to claim 16, wherein the grade of the image data includes at least one of resolution and the number of levels of gradation of the image data.

28. An image processing method according to claim 16, further comprising an output step for outputting the image data transmitted at said transmitting step.

29. An image processing method according to claim 28, wherein said output step is for printing an image through an electrophotographic process.

30. An image processing method according to claim 29 further comprising a step for predicting the time required to generate the image data on a per band basis, and said determining step comprises a step for comparing the predicted time with the time said output step requires to print one band, wherein said determining step determines the grade of the image data to be generated, based on the result of the comparison.

* * * * *